United States Patent
Allen et al.

(10) Patent No.: US 9,659,310 B1
(45) Date of Patent: May 23, 2017

(54) CONSUMPTION BASED SUBSCRIPTION FREQUENCY RECOMMENDATIONS

(75) Inventors: James Gregory Allen, Seattle, WA (US); Jason E. Dishlip, Seattle, WA (US); Steven F. Toth, Seattle, WA (US); Ming-Hsiu Wang, Bellevue, WA (US); Michael J. Beenen, Seattle, WA (US); Laura E. Ford, Seattle, WA (US); Kevin Alexander Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1038 days.

(21) Appl. No.: 13/419,686

(22) Filed: Mar. 14, 2012

(51) Int. Cl.
G06Q 30/00 (2012.01)
G06Q 30/02 (2012.01)

(52) U.S. Cl.
CPC ..... *G06Q 30/0259* (2013.01); *G06Q 30/0201* (2013.01); *G06Q 30/0264* (2013.01)

(58) Field of Classification Search
CPC ............ G06Q 30/0262; G06Q 30/0631
USPC ........................... 705/26, 27, 14
See application file for complete search history.

(56) References Cited

U.S. PATENT DOCUMENTS

| | | | | |
|---|---|---|---|---|
| 5,412,564 | A * | 5/1995 | Ecer | 600/300 |
| 6,305,377 | B1 * | 10/2001 | Portwood et al. | 128/897 |
| 7,953,645 | B2 * | 5/2011 | Kerker | G06Q 10/0875 705/26.1 |
| 8,010,080 | B1 * | 8/2011 | Thenthiruperai et al. | 455/406 |
| 8,484,482 | B1 * | 7/2013 | Cherukumudi et al. | 713/184 |
| 2001/0021914 | A1 * | 9/2001 | Jacobi | G06Q 30/02 705/14.53 |
| 2002/0095345 | A1 * | 7/2002 | Panelli | G06Q 30/02 705/26.35 |
| 2002/0161664 | A1 * | 10/2002 | Shaya | G06Q 30/02 705/7.31 |
| 2008/0015951 | A1 * | 1/2008 | Kerker et al. | 705/26 |
| 2009/0182642 | A1 * | 7/2009 | Sundaresan | G06Q 30/02 705/26.1 |
| 2011/0196724 | A1 * | 8/2011 | Fenton | G06Q 20/108 705/14.16 |

OTHER PUBLICATIONS

PR Newswire: "Consumers Continue to Select PetsMart.com as Their Favorite Internet Pet Site," May 24, 2000; ProQuest Dialog #449327659 3pgs.*

* cited by examiner

*Primary Examiner* — Rob Pond
(74) *Attorney, Agent, or Firm* — Polsinelli LLP (57) ABSTRACT

Disclosed herein are systems, methods, and non-transitory computer-readable storage media for consumption based subscription frequency recommendations. A system configured to practice the example method first evaluates purchase statistics for an item to determine a consumption frequency. The system receives from a user a request for the item, and presents to the user a subscription recommendation based on the consumption frequency. The system can also provide recommendations for accessories by evaluating purchase statistics for an item to determine an accessory for the item, wherein a number of times the accessory is purchased with the item exceeds a threshold, receiving from a user a request for a subscription for recurring purchases of the item, and presenting to the user a recommendation to include the accessory as part of the subscription.

17 Claims, 7 Drawing Sheets

CONSUMPTION BASED SUBSCRIPTION FREQUENCY RECOMMENDATIONS

BACKGROUND

Online or traditional retailers can provide a time and money saving service for users to subscribe for automatic, recurring orders of consumable products, such as toilet paper, contact lenses, or dishwashing detergent. This approach can help the retailer plan and manage the supply chain, negotiate bulk discounts, and so forth. However, one barrier to entry for many customers is that they do not have a good idea of what their consumption rates of a product will be. In other words, customers often do not know what frequency of deliveries or quantities to sign up for, and may be hesitant to sign up for too much or for too little, or to otherwise commit to using or trying an unfamiliar service, even from an established or trusted retailer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments set forth herein relate to enhancing subscription services for consumable items. For example, a retailer can offer a number of different intervals in which customers can subscribe, such as weekly, monthly, every six weeks, every six months, etc. Alternatively, the customer can specify a custom interval, and the system can either implement the custom interval, or fit the user-specified interval to a nearest existing interval. The retailer can present these different intervals to customers as part of signing up for a subscription for recurring, automatic orders of an item. In one simple example, Suzy signs in to the retailer's website and searches for her favorite brand of hand soap. The website recommends a subscription frequency for the hand soap. Suzy can accept the subscription frequency recommendation and agree to subscribe to a recurring order for a two-pack of the hand soap every three months. In this way, the retailer helps Suzy more easily manage her life by reducing the number of items Suzy must remember to purchase, and the retailer can increase the likelihood of future business and plan for that business. However, if Suzy is used to only purchasing single packs of hand soap whenever she is out, she may be uncomfortable with guessing at how much she would actually use. The retailer's website can provide a subscription frequency recommendation to alleviate this problem and to encourage Suzy to purchase the hand soap through the retailer's website.

As another example of a consumption based model for subscription frequency recommendations, Bob browses to the retailer's website looking to buy paper towels. Bob finds a 32-pack of 2-ply paper towels but is unsure how frequently he and his family would use that many paper towels. The system can analyze Bob's profile, detect that he has 4 household members, and recommend a subscription frequency of 3 months. Bob can adjust the subscription frequency or simply accept the recommended frequency to establish a new subscription.

Figure 1:
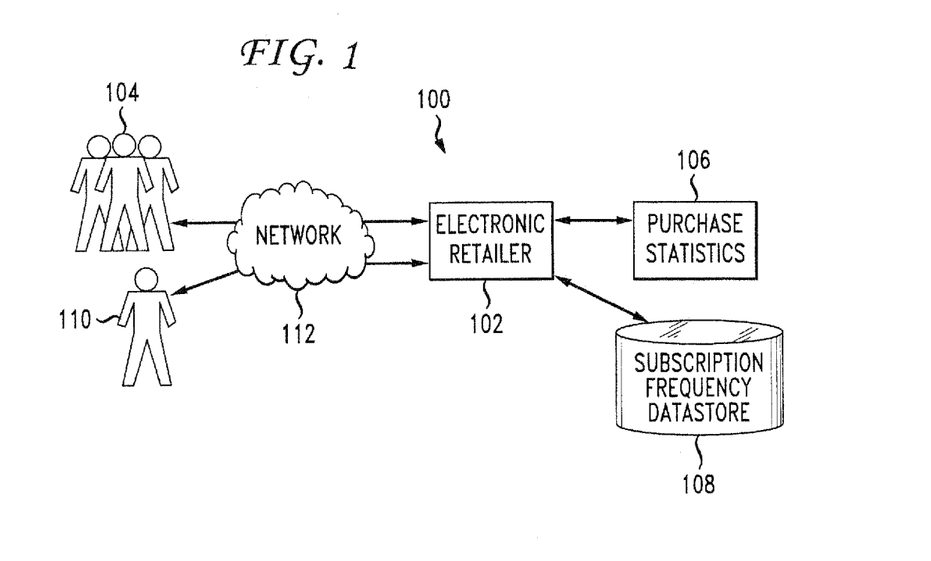
FIG. 1 illustrates a first example system architecture.

FIG. 1 illustrates a first example system architecture 100. In this architecture 100, the electronic retailer 102 tracks purchases and/or enrollment in subscriptions from multiple users 104, such as via a web server operating over a network 112. The electronic retailer 102 stores certain portions of the data as purchase statistics 106 and stores subscription related data in a subscription frequency data store 108. A data store can include any repository for storing data, including a database, distributed storage systems, and other storage technologies. The electronic retailer 102 can sell items directly, and/or can act as a provider of an electronic marketplace in which other retailers participate and offer items for sale. The electronic retailer 102 can keep this information current in real time, or can update the information on some periodic basis. Then, when a potential new subscriber 110 views, browses, or otherwise consumes information at the electronic retailer 102 for an item for which a subscription is available as a service, the electronic retailer 102 analyzes the purchase statistics 106 and the subscription frequency data store 108 to generate a recommended subscription for the potential new subscriber 110.

A subscription indicates a user's 110 desire for a recurring, automatic order of a particular product, item, or consumable. In the context of an electronic retailer, a user 110 subscribes for an item, typically for shipping directly to the user's home. Items can include products, services, downloadable electronic content, and the like, as well as any combination thereof. These subscriptions are different from, for example, a magazine subscription in which a user pays a set amount of money and receives every new edition of the magazine within a specific time period, such as a twelve-month subscription to Newsweek, and are different from subscriptions to a service that function more as a membership, such as a 'subscription' to Netflix streaming that entitles a user to the service of streaming video. The product subscriptions set forth herein are typically for fungible, consumable goods, such as paper towels, soap, socks, makeup, cereal, cat litter, motor oil, and so forth.

The approaches set forth herein can calculate and recommend a frequency based on the consumption patterns of other customers. One simple example approach examines the most commonly subscribed to frequency for a given product and makes recommendations based on that frequency. For example, if 80% of users who subscribe to a 12-pack of tube socks subscribe on a 6-month basis, the electronic retailer 102 can recommend that most commonly subscribed to pack size and frequency to prospective subscribers. However, customers' usage is often different than the stated frequency, because customers can skip deliveries, request early deliveries, and otherwise change their subscription, the electronic retailer 102 can analyze the actual rate of consumption for subscribing customers.

The electronic retailer 102 can, at some regular interval, evaluate each item to which customers have subscribed and determine the rate of orders for each person who has subscribed to that item. The regular interval can be daily, weekly, hourly, monthly, or some other statically determined or dynamically determined period of time. For example, if the average subscription rate for a particular item is every 6 months and only 500 customers are subscribed to that item, then a daily re-evaluation of that item may not be valuable or necessary. On the other hand, if another item has an average subscription rate of 1 week and over 60,000 customers subscribe to that item, then the electronic retailer 102 can evaluate the rate of orders on a daily basis or even more frequently.

The electronic retailer 102 can round an average subscription frequency to the nearest interval and calculate the most common interval for a given product. For example, the average actual consumption rate for a product may be 33 days. In this case, the electronic retailer 102 can round the 33 day interval to the nearest full week, month, or other such period.

The electronic retailer 102 can repeat these steps for all products to which users are subscribed, mapping each item to a recommended interval which is stored in a data store or cache. The data store or cache can then be used to generate and recommend subscription frequency intervals for specific items, specific users, specific geographic areas, and/or for other subsets of customers or items. Then, when a customer is deciding to subscribe to a particular product, or is simply viewing product information, the electronic retailer 102 can present a recommendation of a frequency for a subscription for that product. The electronic retailer 102 can also present a recommendation for an accessory associated with that product as a one-time purchase, as a separate subscription, and/or as a bundle with the subscription for the main product.

The electronic retailer 102 can also record how often users follow the recommendation to allow for future optimizations. Users can either let the subscriptions operate according to the terms initially established, or can delay a subscription delivery, skip a subscription delivery, request early delivery for a subscription delivery, and so forth. These data points can be compiled as feedback for adjusting recommended subscriptions for new subscribers, as well as automatically adjusting existing subscription frequencies for current subscribers.

Figure 2:
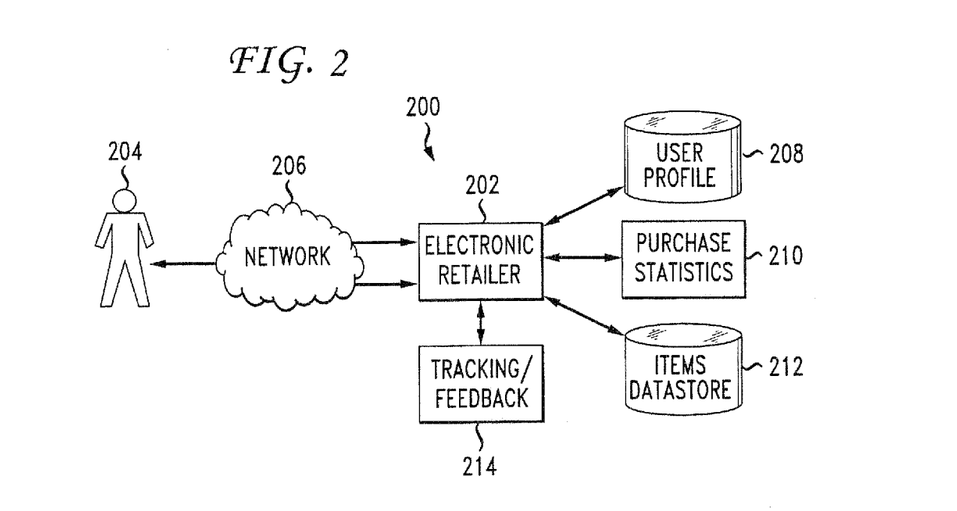
FIG. 2 illustrates a second example system architecture.

FIG. 2 illustrates a second example system architecture 200. In this architecture, the electronic retailer 202 receives a subscription request for an item from a user 204, such as via a network 206. The subscription request can be an explicit request for a subscription for an item, or can be a request for a web page containing information about the item or a related item, for example. The electronic retailer 202 retrieves data from a user profile 208 associated with the user 204. Based on the user profile 208, the electronic retailer 202 analyzes purchase statistics 210 and an items data store 212 to determine a subscription frequency for that item for other users having at least one similarity vector to the user profile 208. The system can select specific similarity vectors based on a type of the item. For example, an item with a regional popularity may indicate to the system to consider or weight a regional similarity more closely than an ethnographic, religious, or age similarity. For example, single males aged 20-45 may subscribe to a particular item once every 4 months, while married females aged 55-60 may subscribe to the same (or similar) item once every 2 weeks. The system can intelligently determine which aspects of the user profile to compare for a particular product. In one instance, however, if the user has a sufficiently strong similarity to a particular group of other users, that strong similarity may outweigh item-specific indications of what to consider.

When the user 204 accepts the recommended subscription frequency from the electronic retailer 202, a tracking/feedback module 214 can track the user's behavior with respect to the subscription. For example, if the user cancels the subscription, changes the subscription, delays delivery of a subscribed item, and so forth, the tracking/feedback module 214 records that information. The tracking/feedback module 214 can correlate changes in the user profile 208 to changes in the subscription. For example, if the user gets married, their subscription habits may change slowly or abruptly. The tracking/feedback module 214 can adjust for these changes, and automatically update the subscription accordingly.

Figure 3:
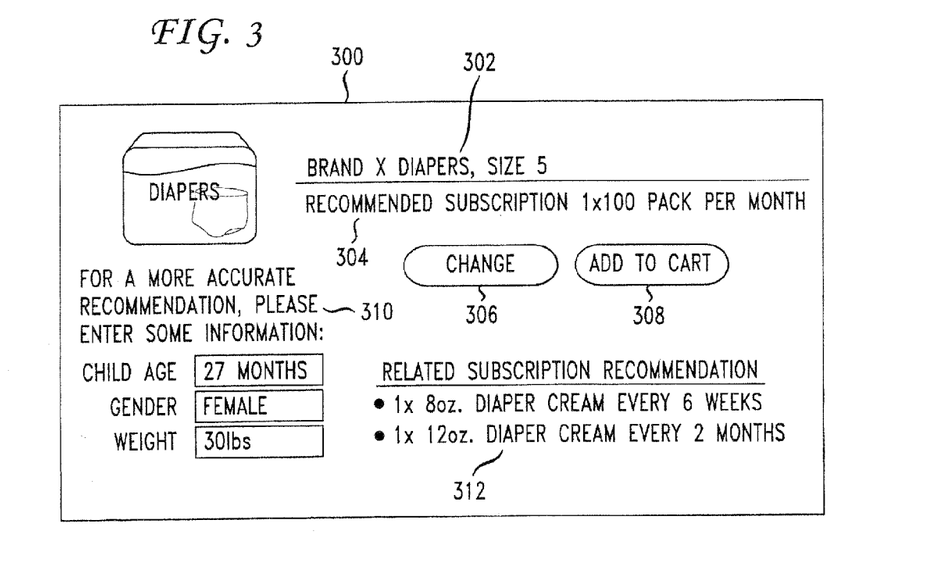
FIG. 3 illustrates an example user interface for a subscription frequency recommendation.

FIG. 3 illustrates an example user interface 300 for a subscription frequency recommendation for diapers. This example interface 300 presents a product description 302 and a recommended subscription 304. In this case, the recommended subscription 304 includes a recommended package quantity (1), an amount of diapers in the package (100), and a frequency (once per month). The interface 300 can provide the user with a first option 306 to change the subscription, and a second option 308 to subscribe using the recommended settings. As set forth above, the system can analyze a user profile for information upon which to base the initial recommended subscription details. This example interface 300 shows a set of fields 310 which show the user all or part of the profile data upon which the subscription recommendation is based. In this example, these fields 310 include, for the user, their child's age, gender, and weight. As the user edits these fields 310, the system can update the subscription recommendation in real-time. The system can use, for example, JavaScript or some other client-side logic or script to scale the subscription recommendation details based on user-supplied information. Alternatively, the system can use AJAX or other technology platform to communicate the changed information to a server that supplies a revised recommendation. For example, if the user changes the child age field from 27 months to 36 months, the system can update the recommended diaper size from 5 to 6, and can update the pack size from 100 diapers to 80 diapers.

FIG. 3 also illustrates two recommended accessories 312. The system can recommend accessories for a subscription as a one-time purchase, as an additional separate subscription, or as part of the main recommended subscription 304. The recommended accessories shown 312 are separate subscriptions. These accessory subscriptions also illustrate an aspect which is applicable to the main subscription. The first recommendation is for an 8 oz. package of diaper cream every 6 weeks, and the second recommendation is for a 12 oz. package of diaper cream every 2 months. Slightly different total amounts of diaper cream would be delivered, on average, by each subscription, but the user may prefer a smaller size because it fits in a diaper bag better. If the user selects a different size pack than one of the recommended options, such as a 2-pack of 16 oz. diaper cream packages, the system can recalculate the subscription recommendation based on the expected usage over time. In this case, if the system recommends 1 12 oz. package every 2 months, if the user selects 2 16 oz. packages, the system can recommend a frequency of every 6 months.

In a simple embodiment where the consumption of a particular product is more or less stable, the expected consumption rate can be represented as a flat line. However, some products may have a more dynamic or complex consumption rate. For example, if the subscribed-to item is an air freshener refill, the initial demand for the subscription may be very high if the user likes the scent of the air freshener. The user may test the scent, and if she likes it, expand the air freshener to other rooms in her house, or to her office. Thus, the system can expect that the consumption rate starts out very low as part of an initial testing phase for the user. If the user does not cancel the subscription, the system can expect the subscription rate to rise dramatically for several subscription cycles, while the user expands the locations for the air freshener. Then, once the expansion phase is over, the system can expect a lower, steadier subscription pace of the air freshener refills. While this particular example illustrates three clear phases in a subscription rate, other items may have a smaller or larger number of 'phases' or may be described by some mathematical function.

The subscription rate may be based on personal profile factors, such as age, geographic location, gender, activities, and the like. For example, a young mother's needs may change in predictable ways as her children get older and reach certain milestones, and as the family expands. The system can track this information via user profiles with the electronic retailer, by tracking subscription or non-subscription purchases of the user, by social networking data, and so forth. As the system gets a more complete picture of the current life situation of the customer, the system can tailor specific recommendations for subscriptions, as well as adapt existing recommendations accordingly.

Having disclosed some basic system components and concepts, the disclosure now turns to the example method embodiments shown in FIGS. 4-7. For the sake of clarity, the methods are discussed in terms of a system as shown in FIG. 8 configured to practice the respective methods. The steps outlined herein are provided as an example configuration and can be implemented in any combination thereof, including combinations that exclude, add, or modify certain steps.

Figure 4:
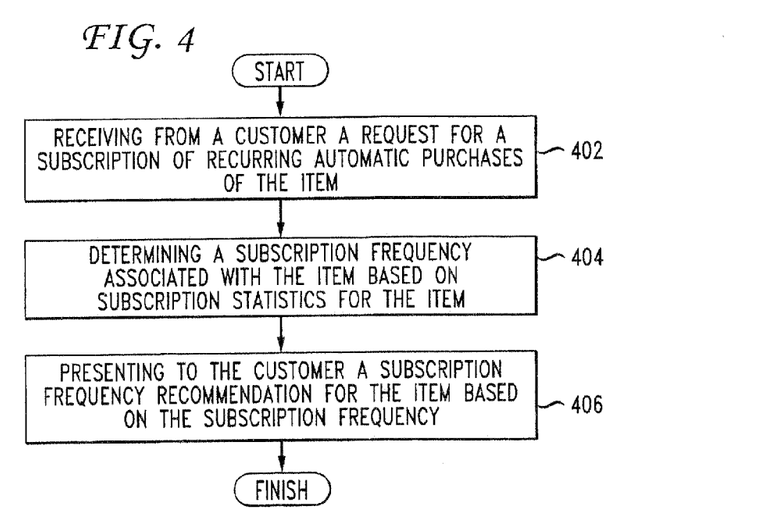
FIG. 4 illustrates a first example method embodiment.

FIG. 4 illustrates a first example method embodiment for recommending a time period for a subscription. The system receives from a customer a request for a subscription of recurring automatic purchases of the item (402), such as via a request for a web page describing the item or a related item. The item can be a specific item, or can be an item type or category. For example, the item can be an 18 oz. tube of Crest UltraWhite Mint Flavor Anti-Cavity Toothpaste with extra Fluoride, whereas the item type can simply be toothpaste. The common consumption frequency can be based on an average rate of orders for the item, which the system can optionally round to a nearest 'interval' such as weekly or monthly. Purchase statistics can include, for example, prior purchases made by other users.

As the system evaluates purchase statistics, the system can distill the subscription frequency recommendation to a discrete unit, such as X item units per month per household member. Then, the system can determine a size of the user's household, either by explicitly asking the user "How many people live in your household?", by reading a user profile, or by estimating a household size based on other data. Based on the determined household size, the system can scale the subscription frequency recommendation up or down accordingly.

The system determines a subscription frequency associated with the item based on subscription statistics for the item (404). Then the system presents to the customer a subscription frequency recommendation for the item based on the subscription frequency (406).

The system can recommend a specific subscription interval, or the user can specify a desired interval. For example, the user can indicate a desire for receiving a three month supply of an item at a time. The system can readjust the quantity of the item in the subscription recommendation for the user-specified interval. If the item is perishable, such as a fruit or vegetable, or otherwise has a short shelf life, the system can impose a maximum interval to avoid spoilage, such as 2 weeks.

The system can present subscription recommendations as part of an advertisement, demonstrating the cost savings that a subscription would provide over buying items individually. Alternatively, when presenting a subscription recommendation, the user may indicate an initial preference for a subscription for a 2-pack of the item, whereas a subscription for a 4-pack of the item can provide a significant savings, by saving on shipping and/or by a quantity discount. The system can provide recommended changes to a subscription along with an indication of a cost savings.

As an item is being phased out, discontinued, or an updated item is released, the system can recommend to the user changing or replacing an existing subscription for the item. Further, the system can incorporate information available about the user to determine whether or not to make the suggestion for the newer product, because some users may desire to use the latest and greatest products, whereas others prefer to stick with what is familiar and reliable. For example, if the subscription is for replacement razor blades, and a razor blade is released with newly designed blades, the system can decide whether or not to recommend the newer razor blades to the user, and can provide, with the recommendation, an indication of what the changed subscription would entail, such as a changed package size, a different product life-expectancy, and/or a different price.

The system can use this same approach to up-sell or convert the user to another product. For example, if the user is browsing for a middle-quality item on the retailer's website, the system can indicate that a subscription to a high-quality item can be only incrementally more expensive than purchasing the middle-quality item one at a time.

Figure 5:
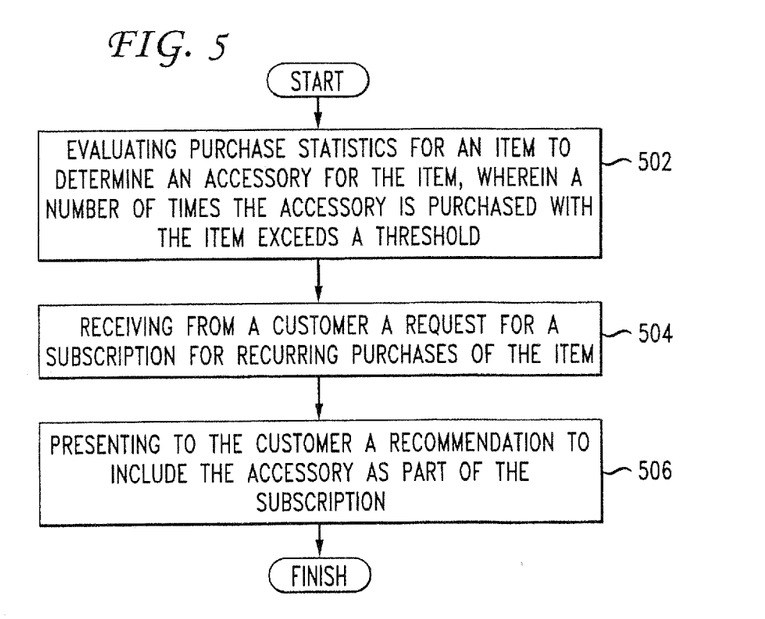
FIG. 5 illustrates a second example method embodiment.

FIG. 5 illustrates a second example method embodiment for recommending an accessory in connection with a subscription. The system evaluates purchase statistics for an item to determine an accessory for the item, wherein a number of times the accessory is purchased with the item exceeds a threshold (502). The accessory can be a supporting item or a related item. For instance, if the item is a portable electronic device, the accessory can be the appropriate batteries. Further, different types of accessories may have different performance characteristics. For example, one type of Duracell batteries may last longer than another type of Energizer batteries. Accordingly, the system can adjust the recommended interval for the accessory (or the main item) based on performance characteristics.

The system can determine the accessory based on a user type. For example, one set of users may use the item with the recommended accessory, while a second set of users may not. Further, the purchase statistics can include actual consumption patterns for the item and accessory as well as established subscriptions.

The system receives from a customer a request for a subscription for recurring purchases of the item (504), and the system presents to the customer a recommendation to include the accessory as part of the subscription (506). However, in the example of the portable electronic device, the main item is not a subscription, but the accessory is recommended as a subscription. Alternatively, the main item can be a subscription, and the system can recommend an accessory on a non-subscription basis. The system can further track how often users accept the recommended accessory, and modify at least one of the accessory and a consumption frequency based on how often users accept recommendations for the accessory.

Similarly, the system can recommend subscriptions to seemingly unrelated items based on informational cues from other subscriptions. For example, a parent subscribes to diapers, but the size of the diapers changes over time based on the child's age, and can be phased out completely as the child transitions to another product, like pull-ups or padded underwear. The system can also recommend other, unrelated products as the child gets older. The purchase statistics or other data can show that as children transition out of diapers, they typically begin brushing their teeth. Based on that data, the system can recommend a subscription to tooth paste and floss as the subscription for diapers terminates or drops below a threshold. Similarly, the system can provide subscription recommendations for new subscriptions or for modifications to existing subscriptions based broadly on life-events or profile changes.

Figure 6:
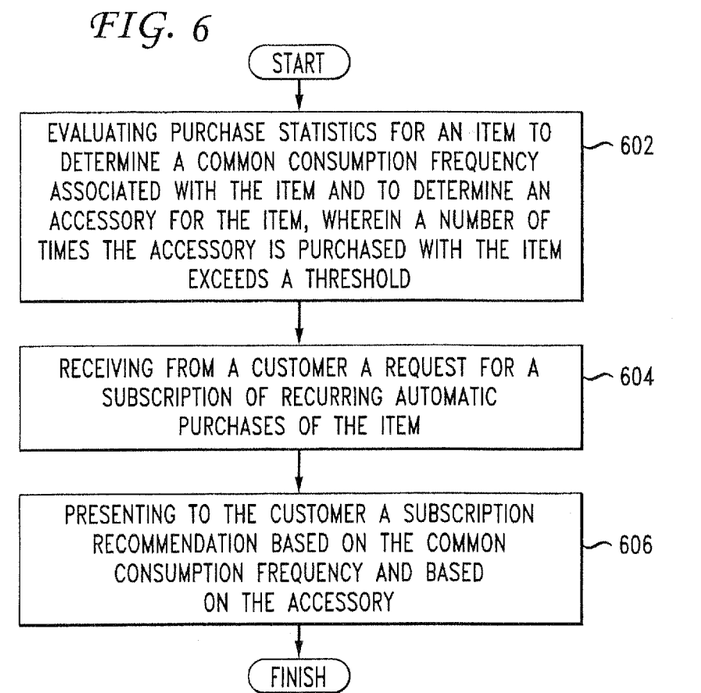
FIG. 6 illustrates a third example method embodiment.

FIG. 6 illustrates a third example method embodiment for recommending a subscription consumption frequency and an accessory. The system evaluates purchase statistics for an item to determine a common consumption frequency associated with the item and to determine an accessory for the item, wherein a number of times the accessory is purchased with the item exceeds a threshold (602). The system can evaluate the purchase statistics by mapping the item to a recommended interval in a data store. The system can also determine a per-user common consumption frequency based on the purchase statistics.

The system receives from a customer a request for a subscription of recurring automatic purchases of the item (604).

The system presents to the customer a subscription recommendation based on the common consumption frequency and based on the accessory (606). The system can generate the subscription recommendation based on the per-user common consumption frequency and based on a number of household members. The common consumption frequency can be based on a function over time and can be based on a per-unit basis for the item. Thus, the subscription recommendation can be based on a package of N units of the item.

The system can also tailor or narrow down the user base upon which the 'most commonly subscribed to frequency' for a product is calculated. For example, the system can generate and/or use a relational database describing the relationships of products to particular social groups, and correlate, for a specific product, a new user to a social group, determine the most common interval, product size, or other subscription details based on that social group, and generate a subscription recommendation based at least in part on the determined information. The system can gather social group information from a social network, from user profile similarities, purchasing habits, and/or other sources.

Figure 7:
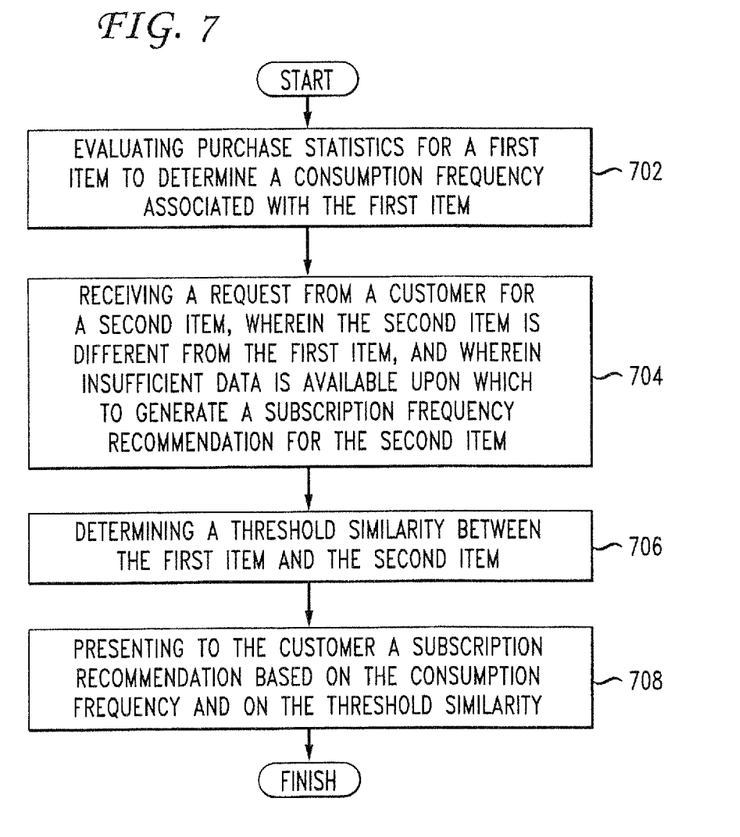
FIG. 7 illustrates a fourth example method embodiment.
Figure 8:
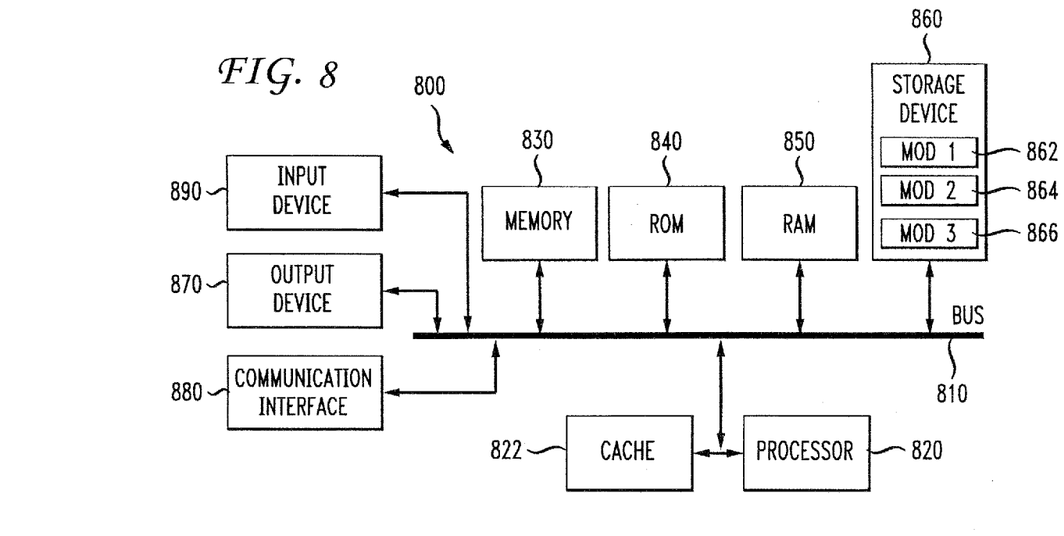
FIG. 8 illustrates an example system embodiment.

FIG. 7 illustrates a fourth example method embodiment for extrapolating, based on a similar item, a consumption frequency for a recommendation. The system evaluates purchase statistics for a first item to determine a consumption frequency associated with the first item (702). The request can be an HTTP request to view a web page associated with the second item, for example.

The system receives a request from a customer for a second item, wherein the second item is different from the first item, and wherein insufficient data is available upon which to generate a subscription frequency recommendation for the second item (704). One common scenario for this step is when insufficient or no data is available upon which to generate a subscription recommendation for the second item.

The system determines a threshold similarity between the first item and the second item (706). The system may also reduce the first item and the second item down to a base unit or smallest common denominator, such as a per-individual-item basis, if the first item and the second items do not come in directly comparably sized units.

The system presents to the customer a subscription recommendation based on the consumption frequency and on the threshold similarity (708).

Further, the system can track a user acceptance rate of subscription recommendations, and establish a new consumption frequency for the second item based on the user acceptance rate. This provides a feedback loop to effectively bootstrap the new consumption frequency in an accurate way.

Figure 9:
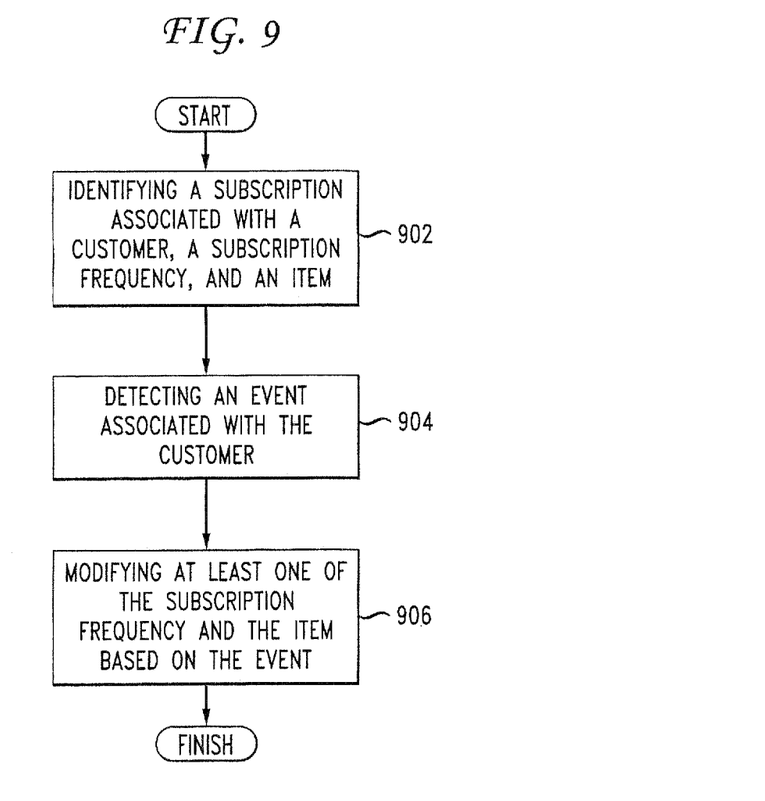
FIG. 9 illustrates a fifth example method embodiment.

FIG. 9 illustrates an example method embodiment for automatically adapting or modifying at least a portion of an existing subscription based on some event. The system identifies a subscription associated with a customer, a subscription frequency, and an item (902). For example, the subscription can be for a 64-pack of newborn infant diapers size 0 to be delivered every week. However, the underlying need for this subscription, i.e. the baby, changes in a predictable way, and the system can adapt the subscription accordingly.

The system detects an event associated with the customer (904). The event can be something as simple as the passage of a certain amount of time, or can be something more specific, such as the purchase of clothing of a certain size that indicates that the child has grown large enough to need a different size diaper. As another example, the customer changes part of the subscription. The system can analyze the changed part of the subscription, and make other related modifications to the subscription.

The system modifies at least one of the subscription frequency and the item based on the event (906). For example, the system can change the item from size 0 to size 1, change the pack size from a 64-pack to a 88-pack, change the subscription frequency from 1 week to 2 weeks, and so forth. A subscription for one item can even morph into a completely different subscription for a different item or into multiple subscriptions. For instance, when the system detects that a subscription for diapers has ended, the system can transition that subscription into a subscription for pull-ups or can automatically create a new subscription to replace a subscription that has ended or is about to end.

A brief description of a basic general-purpose system or computing device in FIG. 8 which can be employed to practice the concepts is provided herein. FIG. 8 illustrates an example system 800 such as a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The modules 862, 864, 866 can be various modules of computing devices shown in FIGS. 1 and 2 such as an electronic retailer, a server, a tracking/feedback system, and so forth. These modules can perform all or part of one or more of the steps illustrated in the example method embodiments. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the example embodiment described herein employs the hard disk 860, it should be appreciated by those skilled in the art that other types of computer readable media which can store data that are accessible by a computer, such as magnetic cassettes, flash memory cards, digital versatile disks, cartridges, random access memory (RAM) 850, read only memory (ROM) 840, a cable or wireless signal containing a bit stream and the like, may also be used in the example operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod 862, Mod 2 864 and Mod 3 866 which are modules configured to control the processor 820. These modules may be stored on the storage device 860 and loaded into RAM 850 or memory 830 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon.

Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof), through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. An electronic marketplace system comprising:
   one or more communication interfaces operable to communicate over a network;
   at least one processor;
   a non-transitory computer-readable storage medium storing instructions, the instructions, when executed by the at least one processor, cause the at least one processor to:
   offer an item for sale through the electronic marketplace system;
   track purchase statistics for the item through the electronic marketplace system based on a plurality of customer profiles associated with customers that purchased the item;
   evaluate the purchase statistics to determine one or more consumption patterns of the item for a plurality of customer profiles based on customer attributes associated with the customer profiles, the customer attributes include at least demographic information and regional information;
   receive, via the electronic marketplace system, a request to purchase the item from a potential subscriber associated with a potential subscriber attribute;
   determine a similarity vector between the potential subscriber attribute and one or more customer attributes associated with the plurality of consumer profiles, the similarity vector includes a weight for at least one customer attribute having a common occurrence in at least a portion of the plurality of customer profiles;
   identify, in response to the request to purchase the item, the consumption pattern for at least one customer profile of the plurality of customer profiles based on the similarity vector; and
   present, through the electronic marketplace system, a subscription frequency recommendation to the potential subscriber in response to the request to purchase the item based on the consumption pattern for the at least one customer profile.

2. The electronic marketplace system of claim 1, wherein the consumption pattern is based on an average subscription frequency for the item.

3. The electronic marketplace system of claim 2, wherein, the instructions, when executed, further cause the processor to:
   round the average subscription frequency to a nearest interval.

4. A system comprising:
   at least one processor; and
   a non-transitory computer-readable storage medium storing instructions which, when executed by the at least one processor, cause the at least one processor to:
   evaluate purchase statistics for items offered through an electronic marketplace to determine a second item is an accessory for a first item when a number of times the second item is purchased with the first item exceeds a threshold;
   evaluate the purchase statistics for the first item to determine one or more consumption patterns of the first item for a plurality of customer profiles based on one or more customer attributes associated with customer profiles for customers that purchased the first item, the customer attributes include at least demographic information and regional information;
   receive a request from a potential subscriber to purchase the first item, the potential subscriber associated with a potential subscriber attribute;
   determine a similarity vector between the potential subscriber attribute and one or more customer attributes associated with the plurality of consumer profiles, the similarity vector includes a weight for at least one customer attribute having a common occurrence in at least a portion of the plurality of customer profiles;

identify, in response to the request to purchase the first item, the consumption pattern for at least one customer profile of the plurality of customer profiles based on the similarity vector; and present a subscription frequency recommendation to the potential subscriber in response to the request to purchase the first item based on the consumption pattern for the at least one customer profile, the subscription frequency recommendation includes the second item as part of a subscription for recurring purchases of the first item.

5. The system of claim 4, wherein the instructions, when executed, further cause the at least one processor to:

determine the second item is an accessory for the first item based on a customer type.

6. The system of claim 4, wherein the instructions, when executed, further cause the at least one processor to:

determine a demographic profile associated with the second item based on the demographic information for the customer profiles associated with a set of customers that purchased the second item; and identify demographic information associated with the potential subscriber; and generate the subscription frequency recommendation based on a similarity of the demographic information associated with the potential subscriber and the demographic profile.

7. The system of claim 4, wherein the second item comprises at least one of a supporting item corresponding to the first item or a related item corresponding to the first item.

8. The system of claim 4, wherein the subscription frequency recommendation further comprises an indication of expected savings when the second item is included as part of the subscription for recurring purchases of the first item compared to separate, non-recurring purchases of the first item and the second item.

9. The system of claim 4, wherein the purchase statistics further comprise actual consumption patterns of other customers.

10. The system of claim 4, wherein the instructions, when executed, further cause the at least one processor to:

modify at least one of the accessory or a consumption frequency based on how often customers accept recommendations for the accessory.

11. A non-transitory computer-readable storage medium having stored therein instructions, the instructions, when executed by at least one computing device, cause the at least one computing device to:

track subscription statistics for an item sold in an electronic marketplace based on a plurality of customer profiles associated with customers that purchased the item;

evaluate the subscription statistics to determine one or more subscription frequencies for a plurality of customer profiles based on customer attributes associated with the customer profiles, the customer attributes include at least demographic information and regional information;

receive a request to purchase the item from a potential customer associated with a potential customer attribute;

determine a similarity vector between the potential customer attribute and one or more customer attributes associated with the plurality of consumer profiles, the similarity vector includes a weight for at least one customer attribute having a common occurrence in at least a portion of the plurality of customer profiles;

determine, in response to the request, a subscription frequency for at least one customer profile of the plurality of customer profiles based on the similarity vector; and present, in response to the request, a subscription frequency recommendation for the item to the potential customer based on the subscription frequency for the at least one customer profile.

12. The non-transitory computer-readable storage medium of claim 11, wherein the instructions, when executed, further cause the at least one computing device to:

identify a manufacturer recommended subscription frequency for the item; and present the manufacturer recommended subscription frequency for the item.

13. The non-transitory computer-readable storage medium of claim 11, wherein the instructions, when executed, further cause the at least one computing device to:

map the item to a predetermined interval in a data store based on a recommended serving size.

14. The non-transitory computer-readable storage medium of claim 11, wherein the instructions, when executed, further cause the at least one computing device to:

determine a per-customer subscription frequency based on the subscription statistics.

15. The non-transitory computer-readable storage medium of claim 14, wherein the instructions, when executed, further cause the at least one computing device to:

determine a number of household members of a customer; and generate the subscription frequency recommendation based on the per-customer subscription frequency and the number of household members.

16. The non-transitory computer-readable storage medium of claim 11, wherein the at least one subscription frequency is further determined by a per-unit basis for the item.

17. The non-transitory computer-readable storage medium of claim 16, wherein the at least one subscription frequency is further determined by a package of N units of the item.

* * * * *